US008177473B2

(12) United States Patent
Gibson et al.

(10) Patent No.: US 8,177,473 B2
(45) Date of Patent: May 15, 2012

(54) SHEET FEEDER

(75) Inventors: Peter William Gibson, Maple Ridge (CA); Juha Rautiainen, Lahti (FI); Pertti Auvinen, Hollola (FI); Mika Hyysti, Lahti (FI); Jarkko Kaislaoja, Lahti (FI)

(73) Assignee: Raute Oyj, Nastola (FI)

( * ) Notice: Subject to any disclaimer, the term of this patent is extended or adjusted under 35 U.S.C. 154(b) by 389 days.

(21) Appl. No.: 12/480,838

(22) Filed: Jun. 9, 2009

(65) Prior Publication Data
US 2009/0243194 A1  Oct. 1, 2009

Related U.S. Application Data

(63) Continuation-in-part of application No. 12/200,938, filed on Aug. 29, 2008, now abandoned.

(30) Foreign Application Priority Data

Aug. 29, 2007 (FI) ...................................... 20070654

(51) Int. Cl.
*B65G 59/02* (2006.01)
(52) U.S. Cl. ........ 414/796.6; 414/797; 271/96; 271/108
(58) Field of Classification Search ............... 414/796.5, 414/796.6, 796.9, 797; 294/65; 271/94, 271/96, 108
See application file for complete search history.

(56) References Cited

U.S. PATENT DOCUMENTS

| | | | | |
|---|---|---|---|---|
| 3,822,024 A | * | 7/1974 | Endter et al. | 414/796.6 |
| 4,637,599 A | | 1/1987 | Eerola | |
| 4,701,094 A | * | 10/1987 | Courjaret et al. | 271/11 |
| 5,139,386 A | * | 8/1992 | Honegger et al. | 414/794.4 |
| 5,649,410 A | * | 7/1997 | Martin et al. | 53/474 |
| 5,678,322 A | | 10/1997 | Potter | |
| 6,739,826 B2 | * | 5/2004 | Gessler | 414/797.1 |
| 6,804,939 B2 | * | 10/2004 | Samborn et al. | 53/493 |
| 6,810,297 B2 | * | 10/2004 | Adin et al. | 700/110 |
| 7,575,408 B2 | * | 8/2009 | Tominaga | 414/416.08 |
| 7,950,708 B2 | * | 5/2011 | Parnell | 294/2 |
| 7,954,623 B2 | * | 6/2011 | Helm | 198/468.4 |
| 7,959,401 B2 | * | 6/2011 | Trejo | 414/795.8 |
| 7,976,013 B1 | * | 7/2011 | Young | 271/30.1 |
| 7,988,406 B2 | * | 8/2011 | Schafer | 414/807 |

* cited by examiner

*Primary Examiner* — Joseph A Dillon, Jr.
(74) *Attorney, Agent, or Firm* — Young & Thompson

(57) ABSTRACT

The invention concerns an apparatus for transferring sheet-like objects from a stack, said apparatus including separate lifting elements gripping by suction to the upper surface of the sheet-like object to be transferred, positioned in a row extending over the stack of the sheet-like objects, and transfer elements for transferring the lifted sheet-like object. The suction effect of the lifting elements is controlled by means of a control device including a light source making a substantially line-shaped illumination pattern. The illumination of the light source is focused at an inclined angle to the surface of the sheet stack, substantially parallel to the lifting element row. A camera means for observing the illumination pattern forwards information about the uniformity of the uppermost layer of the stack.

3 Claims, 4 Drawing Sheets

SHEET FEEDER

CROSS REFERENCE TO RELATED APPLICATIONS

This application is a continuation-in-part of application Ser. No. 12/200,938 filed on Aug. 29, 2008; which claimed priority to Finnish application 20070654 filed Aug. 29, 2007. The entire contents of each of the above-identified applications are hereby incorporated by reference.

FIELD OF THE INVENTION

The present invention concerns an apparatus for transferring sheet-like objects from a stack formed thereof. Especially the invention concerns an apparatus for transferring veneer sheets and the like.

BACKGROUND OF THE INVENTION

Equipment based on suction gripping devices is used for this purpose, for gripping the upper surface of the uppermost veneer sheet in the stack and lifting the sheet, as for instance into contact with further transferring devices. The transferring devices may be horizontal rolls cooperating with the suction gripping devices, having rotating motion parallel to the intended transfer direction. The sheets to be transferred are lifted one by one with the suction gripping devices from the top of the stack into contact with the mantle surface of the rolls, and kept in contact with the mantle surface of the rolls for providing the transferring event. Another way is to pick up the topmost sheet with the suction gripping devices and transfer it onto a conveyor, as for instance a belt conveyor.

The suction gripping devices consist in principle of single suction nozzles arranged in one or several rows extending substantially over the stack. The devices operate without problems with full-sized veneer sheets, but problems are caused by random veneer layers consisting of narrower sheets than the sheets with full width.

It has been tried to compile these random sheet layers so, that the random width sheets are side by side in the layer and cover substantially the same area in the stack as the sheet with full width. At this kind of a stack layer, the transferring devices known in the art in general still operate without problems, in other words, the suction gripping devices get a grip on all sheets of the uppermost layer, and they are moved together from the stack forward, usually to the drying apparatus of veneer.

In spite of careful compiling of the layers in the stack, whether made manually or by machine, there are mistakes occurring when compiling the layers, as a result of which there can be sheets in a layer more or less overlapping each other. Overlapping sheets are also forwarded, when uppermost on the stack, supported by the suction gripping devices, at least partly overlapping. A part of the sheets taken along with the suction gripping devices may loosen too early, and fall back onto the stack, as a result of which the top layer of the stack will be mixed. Due to the overlapping, the veneer sheets that hold on cause problems for the apparatus handling the veneers in the next step, like in the drier, as blockages that are difficult to unblock, incomplete drying etc. A single random veneer left or fallen in the stack follows on top of the next full veneer in the next lifting step causing the overlapping problem.

With the apparatus of the present invention, these problems have been significantly solved.

SUMMARY OF THE INVENTION

The basic structure of the apparatus according to the invention is formed by an apparatus comprising, as known in the art, separate lifting elements gripping by suction to the upper surface of the sheet-like object to be transferred, the lifting elements being positioned in one or several rows extending in one direction over the stack of the sheet-like objects, and transfer elements for transferring the lifted sheet-like objects. According to the characteristics of one embodiment of the invention, the apparatus comprises means to observe the topmost surface of the stack of the sheet-like objects by means of a control device including at least one light source creating a substantially line-shaped illumination pattern, said illumination being focused adjacent and substantially parallel to a lifting element row, at an inclined angle to the plane of the topmost surface of the stack of the sheet-like objects, and a camera means observing the illumination pattern, and means to control the suction effect of the lifting elements in each row adjacent to a illuminated pattern based on the information observed by the camera means for the actual illumination pattern.

BRIEF DESCRIPTION OF THE DRAWINGS

The invention will be described in more detail in the following with reference to the enclosed drawings, wherein.

DETAILED DESCRIPTION OF THE INVENTION

Figure 1:
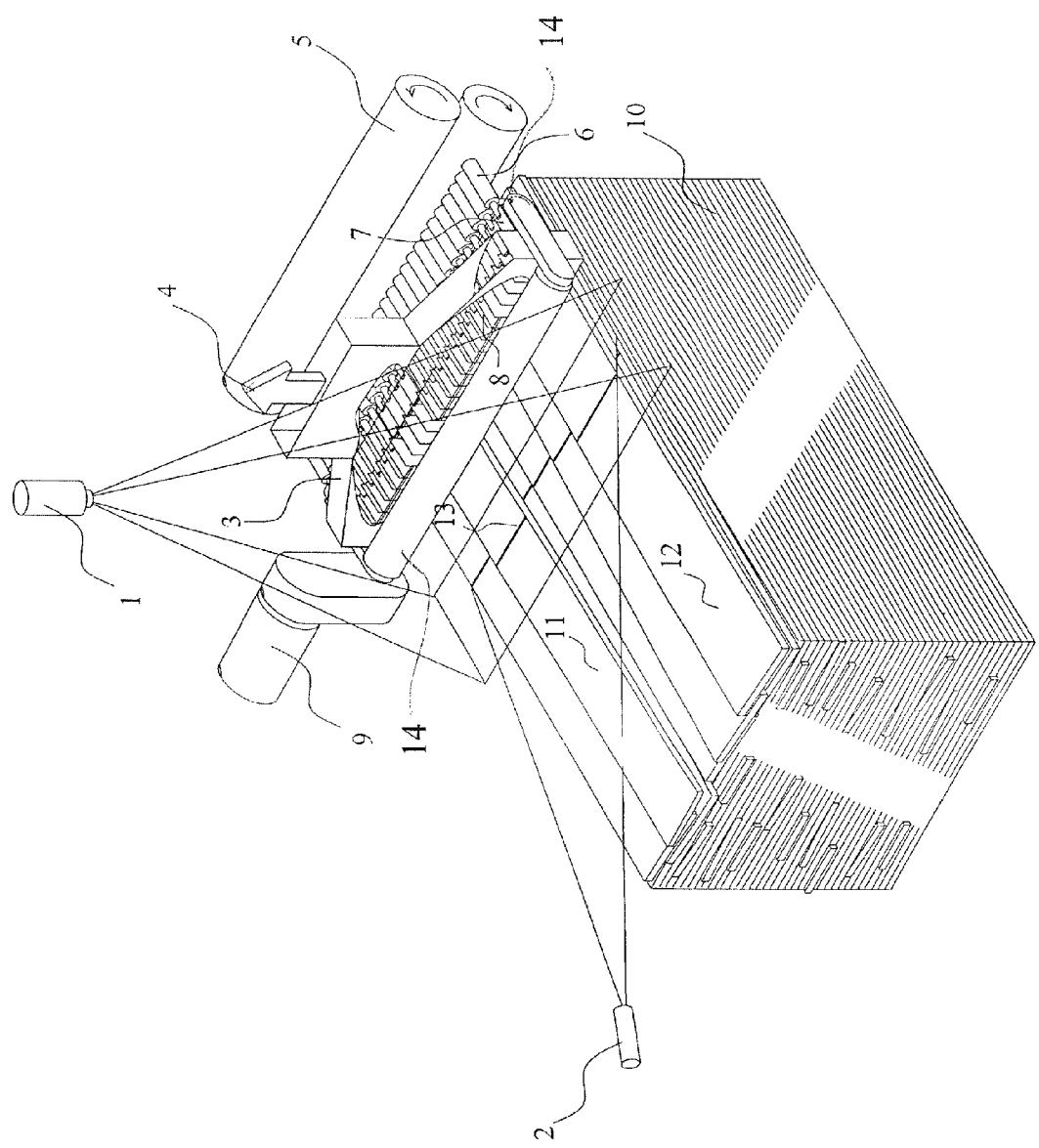
FIG. 1 shows one embodiment of the apparatus according to the invention for transferring veneer sheets from a stack.

FIG. 1 shows schematically a veneer stack 10, where veneer sheets are being removed from, layer by layer, to be forwarded to further processing, like drier. The veneer layer is lifted from the stack by means of suction lifting devices 8 operative in the vicinity of the upper surface of the veneers. When the suction effect 4 is active, the suction lifting devices grip the veneer or veneers of the uppermost veneer layer and bring them into contact with the rolls 14, keeping the lifted veneer or veneers in contact with the rolls. The rolls have rotational motion in the transfer direction, and they take the veneer or veneers in the intended transfer direction, for example to be transferred by the rolls 5. FIG. 1 shows a typical problem situation that can occur in the stack 10 in cases, where there is a layer composed of random width veneer sheets. The veneer sheets are partly overlapping. Thus, an apparatus having the construction of prior art would probably face an operating disturbance.

To avoid the operating disturbance, the basic apparatus is complemented with an additional device according to the present invention, by means of which the operation of the suction lifting devices can be controlled in an appropriate way.

Each of the suction lifting devices 8 is equipped with respective closing means that in the described embodiment is formed by a slide 7 and an actuator 6, like a pneumatic cylinder-piston device. With the closing means, each suction lifting device can be connected to or disconnected from the suction effect 4. Individual operation of the actuators is controlled by an activating device being able to make logical decisions based on the received information. The activating device is not shown in the figure. This kind of a device is well known to a person skilled in the art, and there is no need to describe its operation in detail in this connection. The activating device receives the required information from the camera means 1 included in the apparatus. The camera means is a matrix camera known in the art, having a suitable resolution for the task. The visibility range of the camera reaches over the veneer stack, and is in the perpendicular direction wide enough to observe the illumination pattern focused onto the surface of the veneer stack.

Figure 2:
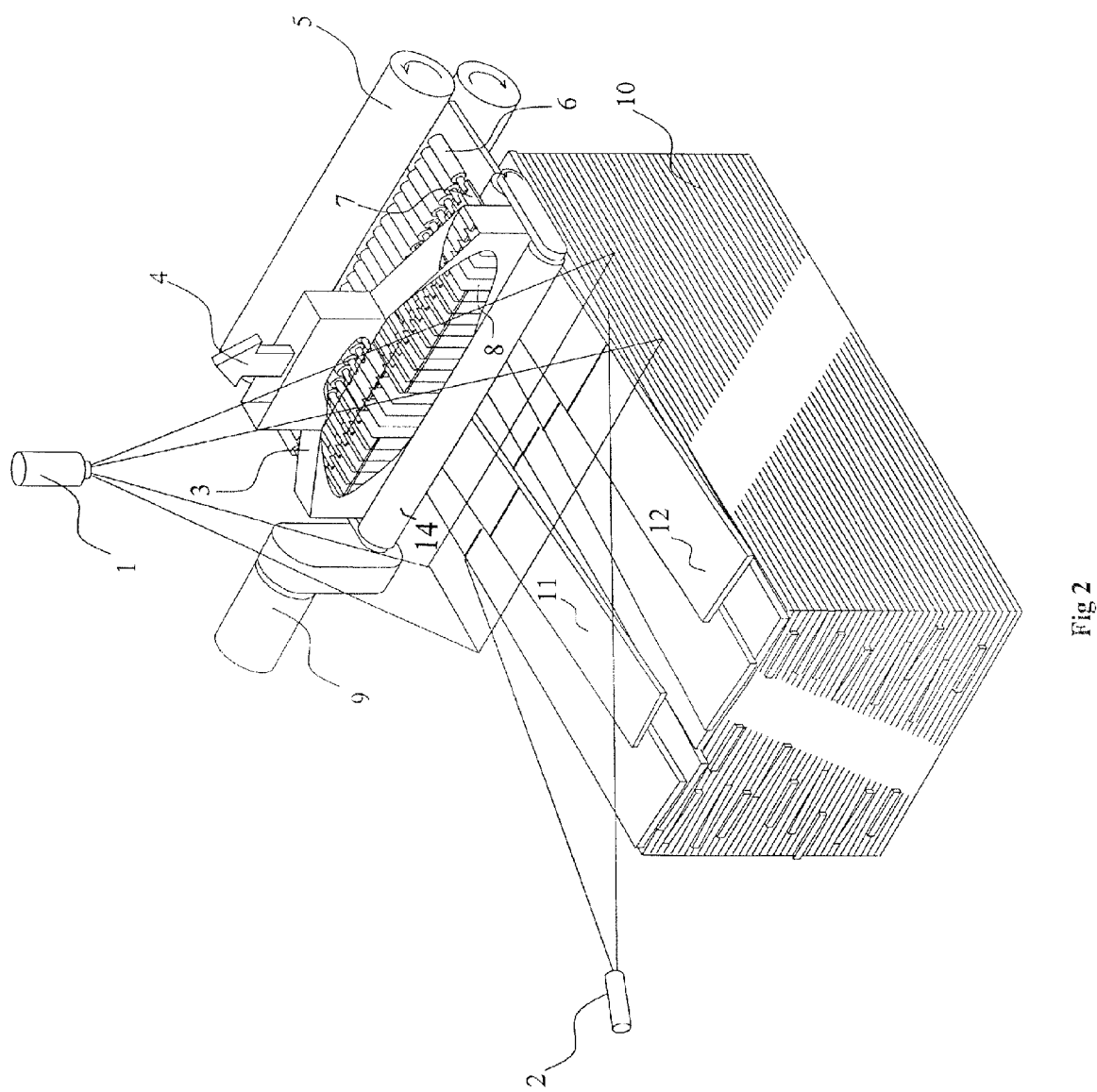
FIG. 2 shows the apparatus of FIG. 1 at the operating stage.

The illumination pattern is focused onto the surface of the veneer stack line-shaped, with a strong light source 2, suitable for this purpose being a laser light source. The illumination is focused onto the surface of the stack at an inclined angle of 20° to 45°, for example. If there happens to be veneer sheets positioned overlapping on the surface of the stack, the beam of light first meets the sheets locating highest on the stack, like sheets 11 and 12 in FIG. 1. The sheets locating lower get to the beam of light at a longer distance from the light source 2, whereby the illumination pattern formed onto the surface of the stack is correspondingly stepped. This stepness will be discovered by the camera 2. It gives information on the location of the steps of the illumination pattern in the transfer direction of the veneer sheets, and the extension of each step in the direction of the illumination pattern. Based on this information, the activation device of the suction lifting devices makes logical decisions, which of the veneer sheets (11 and 12) is/are uppermost in the stack, and what is their location in the stack, in the transversal direction with respect to the transfer direction. Based on these decisions, the activating device controls the closing means 8 to open only at the veneer sheets lying uppermost in the stack, whereby only those are taken to be transferred with the rolls 14 and are removed from the stack, as depicted in FIG. 2.

Figure 3:
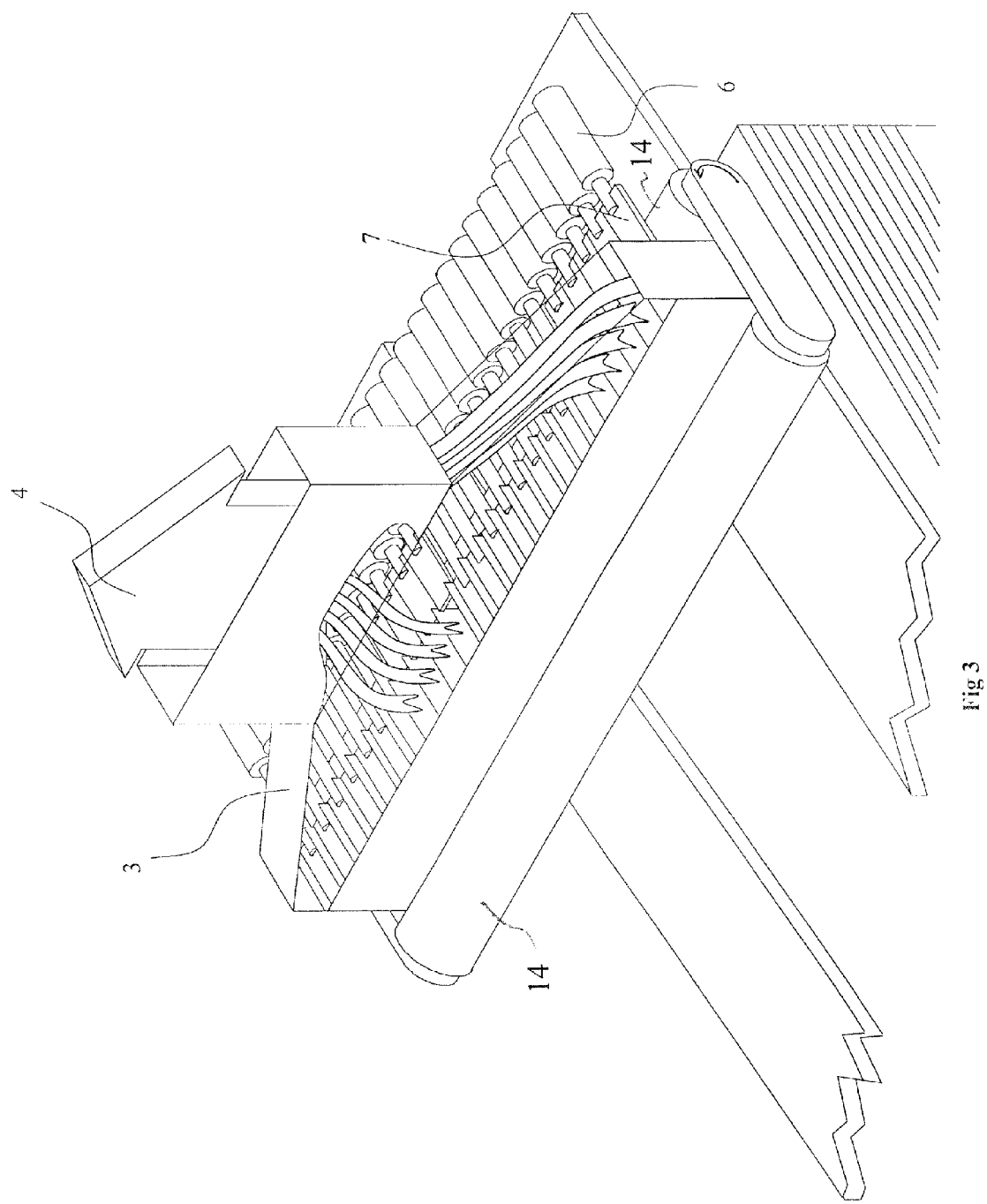
FIG. 3 illustrates the effect of the control of suction lifting devices on the operation of the device.
Figure 4:
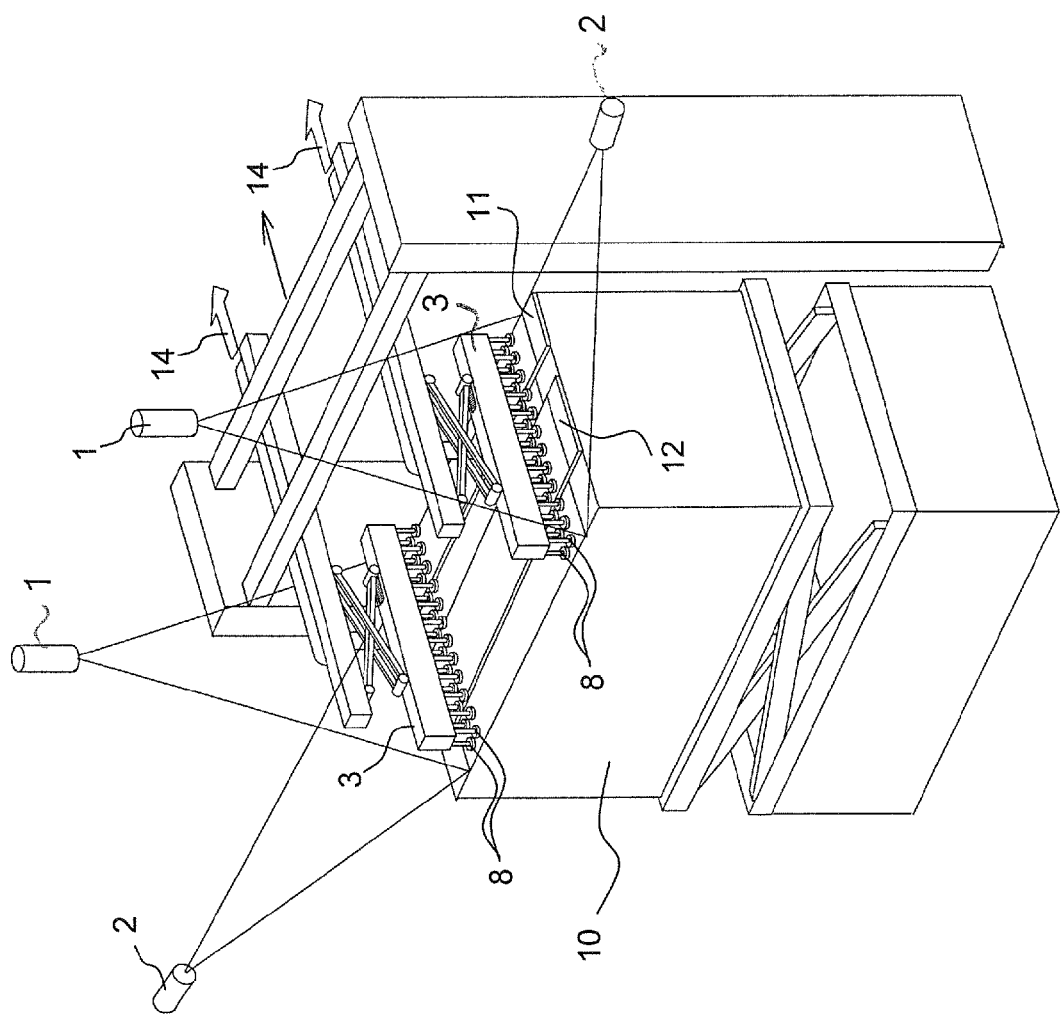
FIG. 4 shows one further embodiment of the apparatus according to the invention

An alternative accomplishment of the apparatus of the invention is illustrated in the drawing FIG. 4, which apparatus includes suction devices 8 arranged in several parallel rows, supported on two parallel lifting beams 3. Each suction device 8 in one row is controlled commonly with the adjacent suction device in the adjoining row on the same beam, or independently, principally with the devices described in connection with the apparatus of the drawing FIGS. 1 to 3. This embodiment of the apparatus of the invention includes two separate illumination devices 2, one for each of the lifting beams 3, and correspondingly two separate camera devices 1 for detecting the illumination pattern on the top of the veneer sheet stack 10. Each of the camera devices 1 gives a signal of the configuration of the illumination pattern on the top of the veneer sheet stack to the apparatus (not shown) for the determination of the evenness of the top layer in the stack, and for the conclusions which pair of the suction pads 8 is activated and which is closed.

The beams 3 transfer the lifted topmost veneer sheet or sheets for further transfer, as for instance on a belt conveyor leading to a veneer dryer apparatus.

The capacity of the apparatus further processing the veneers will be underutilized per each such lifting turn, but there will be no overlapping veneer sheets in the apparatus, and no veneer sheets drop back on top of the veneer stack. Correspondingly, the problems being caused by the sources in question will be avoided in the operation of the apparatus.

The invention claimed is:

1. An apparatus for transferring wooden veneer sheets from a stack of horizontal veneer sheets of variable widths, each layer of said stack having at least one veneer sheet stacked one of i) singly, ii) side-by-side and iii) overlapping, said apparatus comprising:
    separate lifting elements that lift and grip by suction an upper surface of each top-most veneer sheet in the stack, the lifting elements being positioned in at least one row extending in one direction over the stack of the veneer sheets;
    transfer elements for transferring the lifted veneers;
    means to observe a top most surface of the stack of the veneers by means of a control device comprising:
        at least one light source creating a line-shaped illumination pattern, said illumination pattern being focused adjacent and parallel to a lifting element row, at an inclined angle to a plane of the top most surface of the stack of the veneer sheets, and
        a camera means observing the illumination pattern; and
    means to control a suction effect of the lifting elements in each row adjacent to the illuminated pattern based on information observed by the camera means for the illumination pattern by opening only those lifting elements positioned above such top-most veneer sheets.

2. The apparatus according to claim 1, wherein a suction control means comprise a slide actuator for controllably opening and closing the suction effect of the lifting elements, respectively.

3. An apparatus for forwarding transfer wooden veneer sheets of variable widths from a stack of horizontal veneer sheets, each layer of said stack having at least one veneer sheet stacked one of i) singly, ii) side-by-side and
    iii) overlapping, said apparatus comprising:
        separate lifting elements positioned in a row extending horizontally over the stack in transversal direction with respect to a forwarding transfer direction from the stack, said lifting elements being connected to a vacuum means and equipped with an opening and closing means for each element for releasable gripping by suction to an upper surface one of at least one veneer sheet lying top-most in the stack, and to be transferred from the stack,
        transfer elements for transferring at least one veneer from the stack; and
        a control device comprising:
            a light source creating a line-shaped illumination pattern focused parallel to a lifting element row, at an inclined angle to a plane of the top surface of the veneer stack, and
            a camera means for observing the illumination pattern, the gripping operation of the lifting elements being individually controlled by means of said control device by opening only those lifting elements positioned above the top-most veneer sheets.

* * * * *